(12) United States Patent
Najork et al.

(10) Patent No.: US 6,301,614 B1
(45) Date of Patent: Oct. 9, 2001

(54) SYSTEM AND METHOD FOR EFFICIENT REPRESENTATION OF DATA SET ADDRESSES IN A WEB CRAWLER

(75) Inventors: Marc Alexander Najork, Palo Alto; Clark Allan Heydon, San Francisco, both of CA (US)

(73) Assignee: Alta Vista Company, Palo Alto, CA (US)

( * ) Notice: Subject to any disclaimer, the term of this patent is extended or adjusted under 35 U.S.C. 154(b) by 0 days.

(21) Appl. No.: 09/433,008

(22) Filed: Nov. 2, 1999

(51) Int. Cl.[7] .......................... G06F 15/173; G06F 13/38
(52) U.S. Cl. .................. 709/223; 709/218; 709/215; 709/245; 709/216; 707/10; 707/3; 707/5
(58) Field of Search .................................. 709/218, 223, 709/245, 215, 216; 707/10, 3, 5, 1

(56) References Cited

U.S. PATENT DOCUMENTS

| | | | |
|---|---|---|---|
| 5,864,852 | * | 1/1999 | Luotonen ............................. 707/10 |
| 5,898,836 | * | 4/1999 | Freivald et al. ..................... 709/218 |
| 5,974,455 | * | 10/1999 | Monier ............................... 709/223 |
| 6,094,649 | * | 7/2000 | Bowen et al. ........................ 707/3 |

* cited by examiner

Primary Examiner—Mark H. Rinehart
Assistant Examiner—Farzaneh Farahi
(74) Attorney, Agent, or Firm—Gary S. Williams; Pennie & Edmonds LLP

(57) ABSTRACT

A web crawler stores fixed length representations of document addresses in first and second caches and a disk file. When the web crawler downloads a document from a host computer, it identifies URL's (document addresses) in the downloaded document. Each identified URL is converted into a fixed size numerical representation. The numerical representation is systematically compared to numerical representations in the caches and disk file. If the representation is not found in the caches and disk file, the document corresponding to the representation is scheduled for downloading, and the representation is stored in the second cache. If the representation is not found in the caches but is found in the disk file, the representation is added to the first cache. When the second cache is full, it is merged with the disk file and the second cache is reset to an initial state. When the first cache is full, one or more representations are evicted in accordance with an eviction policy. The representations include a prefix that is a function of a host component of the corresponding URL's, and the representations are stored in the disk file in sorted order. When the web crawler searches for a representation in the disk file, an index of the disk file is searched to identify a single block of the disk file, and only that single block of the disk file is searched for the representation.

22 Claims, 4 Drawing Sheets

SYSTEM AND METHOD FOR EFFICIENT REPRESENTATION OF DATA SET ADDRESSES IN A WEB CRAWLER

The present invention relates to a system and method for representation of document addresses in a web crawler and, more particularly, to a method for efficiently representing the addresses of downloaded documents even when memory space is relatively small.

BACKGROUND OF THE INVENTION

Documents on interconnected computer networks are typically stored on numerous host computers that are connected over the networks. For example, so-called "web pages" may be stored on the global computer network known as the Internet, which includes the world wide web. Web pages can also be stored on Intranets, which are typically private networks maintained by corporations, government entities, and other groups. Each web page, whether on the world wide web or an Intranet, has a distinct address called its uniform resource locator (URL), which at least in part identifies the location or host computer of the web page. Many of the documents on Intranets and the world wide web are written in standard document description languages (e.g., HTML, XML). Theses languages allow an author of a document to create hypertext links to other documents. Hypertext links allow a reader of a web page to quickly move to another web page by clicking on the links. These links are typically highlighted in the original web page. A web page containing hypertext links to other web pages generally refers to those pages by their URL's. Links in a web page may refer to web pages that are stored in the same or different host computers.

A web crawler is a program that automatically finds and downloads documents from host computers in an Intranet or the world wide web. When a web crawler is given a set of starting URL's, the web crawler downloads the corresponding documents, then the web crawler extracts any URL's contained in those downloaded documents. Before the web crawler downloads the documents associated with the newly discovered URL's, the web crawler needs to find out whether these documents have already been downloaded. If the documents associated with the newly discovered URL's have not been downloaded, the web crawler downloads the documents and extracts any URL's contained in them. This process repeats indefinitely or until a predetermined stop condition occurs.

Typically, to find out whether the documents associated with a set of discovered URL's have already been downloaded, the web crawler checks a directory of downloaded document addresses. The directory stores the URL's of the downloaded documents, or representations of the URL's. The set of downloaded document addresses could potentially contain addresses of every document on the world wide web. As of 1999 there were approximately 500 million web pages on the world wide web and the number is continuously growing. Even Intranets can store millions of web pages. Thus, web crawlers need efficient data structures to keep track of downloaded documents and any discovered addresses of documents to be downloaded. Such data structures are needed to facilitate fast data checking and to avoid downloading a document multiple times.

One example of a known prior art method designed to facilitate fast data checking and to avoid downloading a document multiple times is the method implemented by the Scooter web crawler used by Alta Visa. In the Scooter web crawler, the set of downloaded document addresses is represented by a set of corresponding fingerprints. Each fingerprint in the set of fingerprints is a fixed-size numerical checksum, calculated directly from its corresponding URL.

For fast data access, the Scooter web crawler stores the set of fingerprints entirely in main memory. Due to the volume of documents on the world wide web, Scooter requires an extremely large main memory for storage of the directory of known web pages. The present invention provides more efficient document address representation and storage methods that avoid certain of the disadvantages and inefficiencies in the prior art.

SUMMARY OF THE INVENTION

The present invention allows an efficient representation of a set of downloaded document addresses using a bounded main memory and an unbounded disk file. This invention also provides efficient address lookup operations.

When a URL is found by the web crawler in a downloaded document, that URL is converted into a fixed size numerical representation based at least in part on the host component of the corresponding URL. The URL's numerical representation is systematically compared to a structured set of stored numerical representations (converted from downloaded document addresses) in multiple memory caches and a disk file. If the new numerical representation is not found in the set of stored numerical representations, the URL's numerical representation is added to the set and its corresponding document is scheduled for downloading.

Main memory usage is user configurable and most of the fixed-size numerical representations of URL's are stored on a disk file. While most of the fixed-size numerical representations of URL's are stored on the disk file, data look-up remains fast because an in-memory cache is used to store the numerical representations of recently looked-up URL's, another in-memory cache is used to store recently added numerical representations, and an index for the disk file is used to reduce the number of disk reads performed by the operating system.

The present application is applicable to both Internet and Intranet web crawlers.

DETAILED DESCRIPTION OF EXEMPLARY EMBODIMENTS

Figure 1:
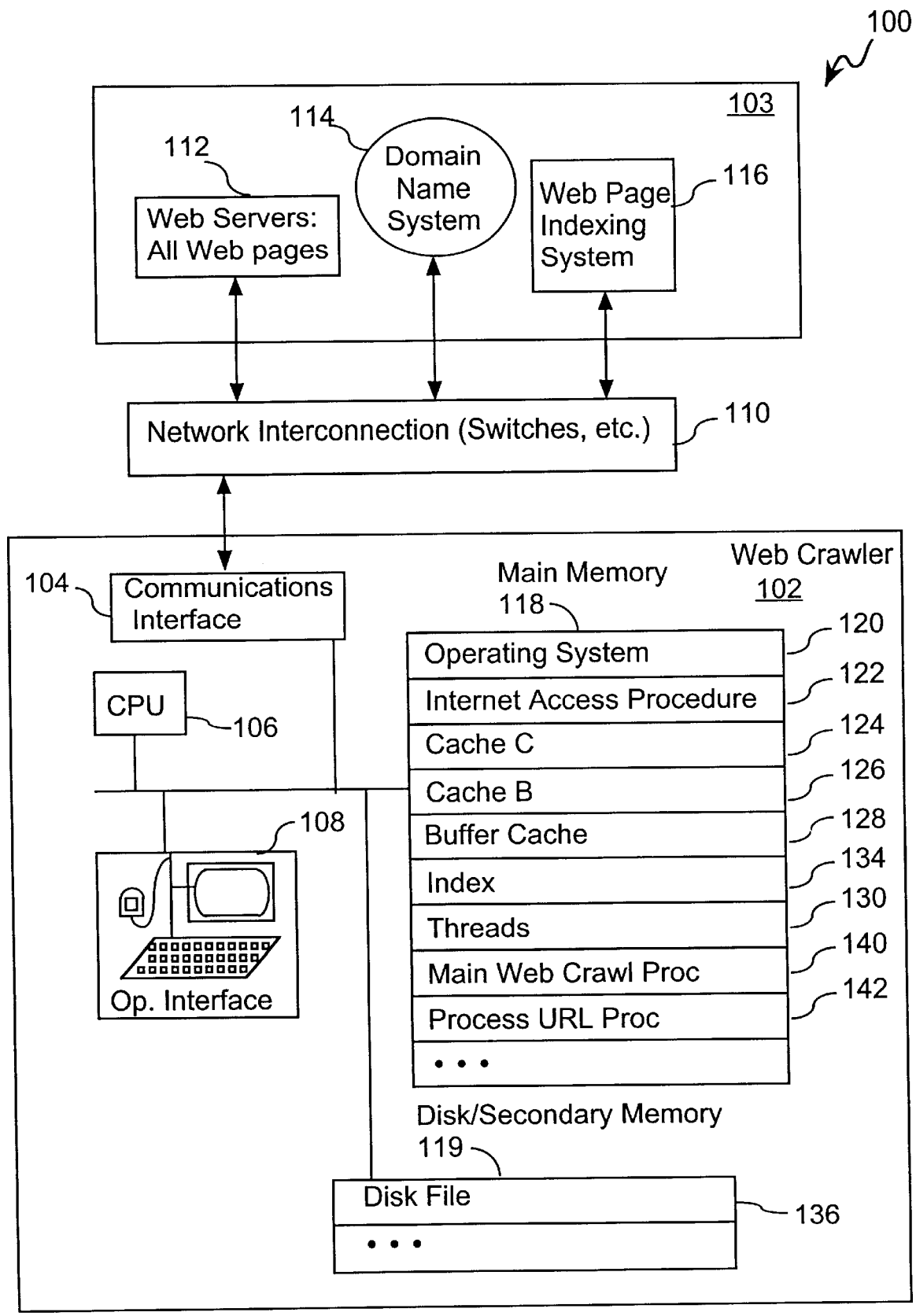
FIG. 1 is a block diagram of a system network in accordance with an embodiment of the invention.

FIG. 1 shows an exemplary embodiment of a distributed computer system 100. The distributed computer system 100 includes a web crawler 102 connected to a network 103 through a network interconnection 110. The network 103 may be a global communication network, such as the Internet, or a private network, sometimes called an Intranet. Examples of network interconnection 110 includes switches, routers, etc.

The Internet network 103 includes web servers 112 and a service known as a domain name system 114. It may also optionally include a web page indexing system 116. The web servers 112 store web pages. The domain name system 114 is a distributed database that provides the mapping between Internet Protocol (IP) addresses and hostnames. The domain name system 114 is a distributed system because no single site on the Internet has the domain name mapping information for all the web servers in the network. Each site participating in the domain name system 114 maintains its own database of information and runs a server program that other systems across the Intranet or Internet can query. The domain name system provides the protocol that allows clients and servers to communicate with each other. Any application may look up the IP address (or addresses) corresponding to a given hostname or the hostname corresponding to a given IP address in the domain name system 114. An application accesses the domain name system 114 through a resolver. The resolver contacts one or more name servers to perform a mapping of a hostname to the corresponding IP address, or vice versa. A given hostname may be associated with more than one IP address because an Intranet or Internet host may have multiple interfaces, with each interface of the host having a unique IP address.

The web page indexing system 116 includes an index of words used on the world wide web and addresses of the web pages that use each word. Such indexing systems are maintained by various search engines, such as the Alta Vista search engine. The domain name system 114 and the web page indexing system 116 may be accessed by the web crawler 102 in the process of downloading web pages from the world wide web.

The web crawler 102 includes a communications interface 104, one or more CPU's 106, an operator interface 108 (which may be remotely located on another computer), primary or main memory 118 and secondary (e.g. disk) memory 119. In an exemplary embodiment, the communications interface 104 is able to handle overlapping communication requests. The memory 118 includes:

- a multitasking operating system 120;
- an Intranet/Internet access procedure 122 for fetching web pages as well as communicating with the domain name system 114;
- a fixed size cache C 124 for storing recently looked-up numerical representations of URL's;
- a fixed size cache B 126 for storing recently added numerical representations of URL's;
- a buffer cache 128 maintained by the operating system for storing accessed disk block(s);
- an index 134 indicating the first numerical representation stored in each disk block of a disk file 136;
- threads 130 for downloading web pages from the servers 112, and processing the downloaded web pages;
- a main web crawler procedure 140 executed by each of the threads 130; and
- a URL processing procedure 142 executed by each of the threads 130 to process the URL's identified in a downloaded web page.

It should be noted that caches C and B are preferably implemented in main memory as hash tables to facilitate fast lookup operations.

The disk file 136, which is not bounded in size, is stored in secondary (e.g., disk) storage 119. The caches C and B 124, 126 and the disk file 136 store a numerical representation of each URL known to the web crawler. As will be described in more detail below, the numerical representations of the URL's are formed and stored in a manner designed to minimize disk access. In particular, it is well known that, on average, many of the URL's in any particular document will typically point to multiple documents on the same host. Each URL numeric representation has a prefix portion and a suffix portion. The prefix is solely a function of the host portion of the URL, while the suffix is a function of the entire URL. As a result, all URL's having the same most component have a common prefix, and therefore when the URL numeric representations are arranged in a predefined (e.g., numerically ascending or descending) sorted order, the URL numeric representations for documents on a particular host will form a contiguous set of items.

The index 134 stores the numeric representation for the first URL in each disk block of the disk file 136. Since the disk file is in sorted order, the URL numeric representations in the index 134 are also stored in sorted order. By using the index 134 to determine which disk block of the disk file 136 a URL would be stored in, if that URL were stored in the disk file, the number of disk reads (read kernel calls) performed per look-up in the disk file 136 is reduced. In fact, any single look-up operation will never require more than one disk read operation. The average number of disk reads per look-up operation is a function of the size of the two caches 124, 126, and the number of disk blocks stored in the buffer cache 128, and generally will be much, much less than one.

Figure 2:
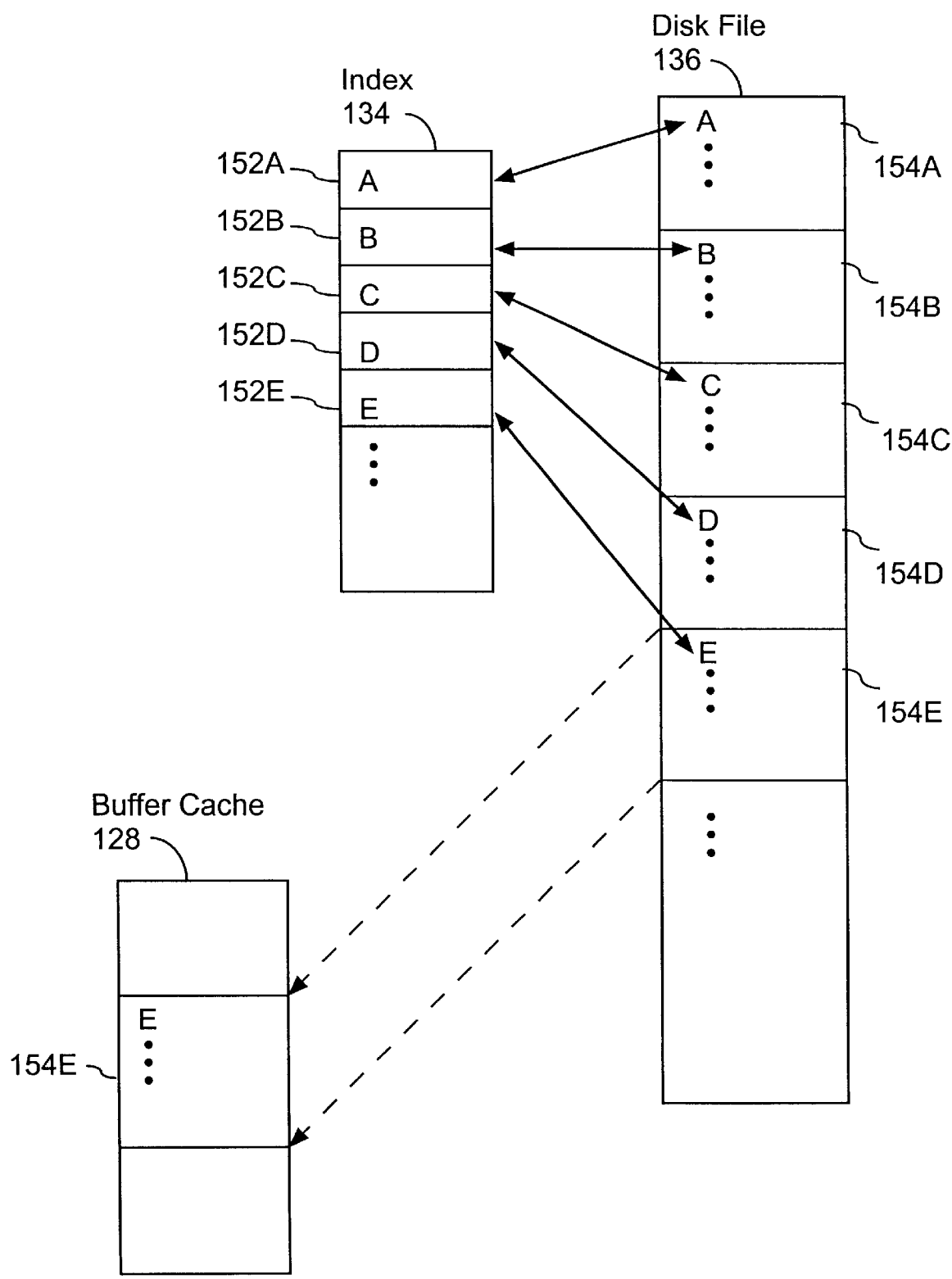
FIG. 2 is a block diagram of data structures used in an embodiment of the invention.

Referring to FIG. 2, the disk file 136 includes an unbounded number of disk blocks 154A–154E. The index 134 contains the first numerical representation 152A–152E in each disk block 154 in the disk file 136. In the exemplary embodiment, when a particular disk block, for example, 154E, is accessed, the disk block 154E is copied by the operating system to the buffer cache 128. The buffer cache 128 is an array in main memory 118 that stores a fixed, relatively small number of disk blocks. The buffer cache 128 may be in either user level program memory or kernel level memory within the operating system 120. Caching one or more accessed disk blocks 154 in buffer cache 128 increases the efficiency of data look-ups and reduces hard drive access. Disk blocks are evicted from the buffer cache 128 when space is needed for newly accessed disk blocks. The disk block to be evicted at any one time is determined using an appropriate eviction policy, such as a least recently used eviction policy or a round robin eviction policy.

Main Web Crawler Procedure

In the exemplary embodiment the web crawler uses multiple threads to download and process documents. The web crawler 102 is given a set of initial URL's and begins downloading documents using those URL's. Various data structures may be used to keep track of which documents (web pages) the threads should download and process, but those particular data structures are not the subject of the present document. Rather, the present invention concerns the data structures and methods used to keep track of the URL's of documents that have already been downloaded or that have already been scheduled for downloading.

Figure 3:
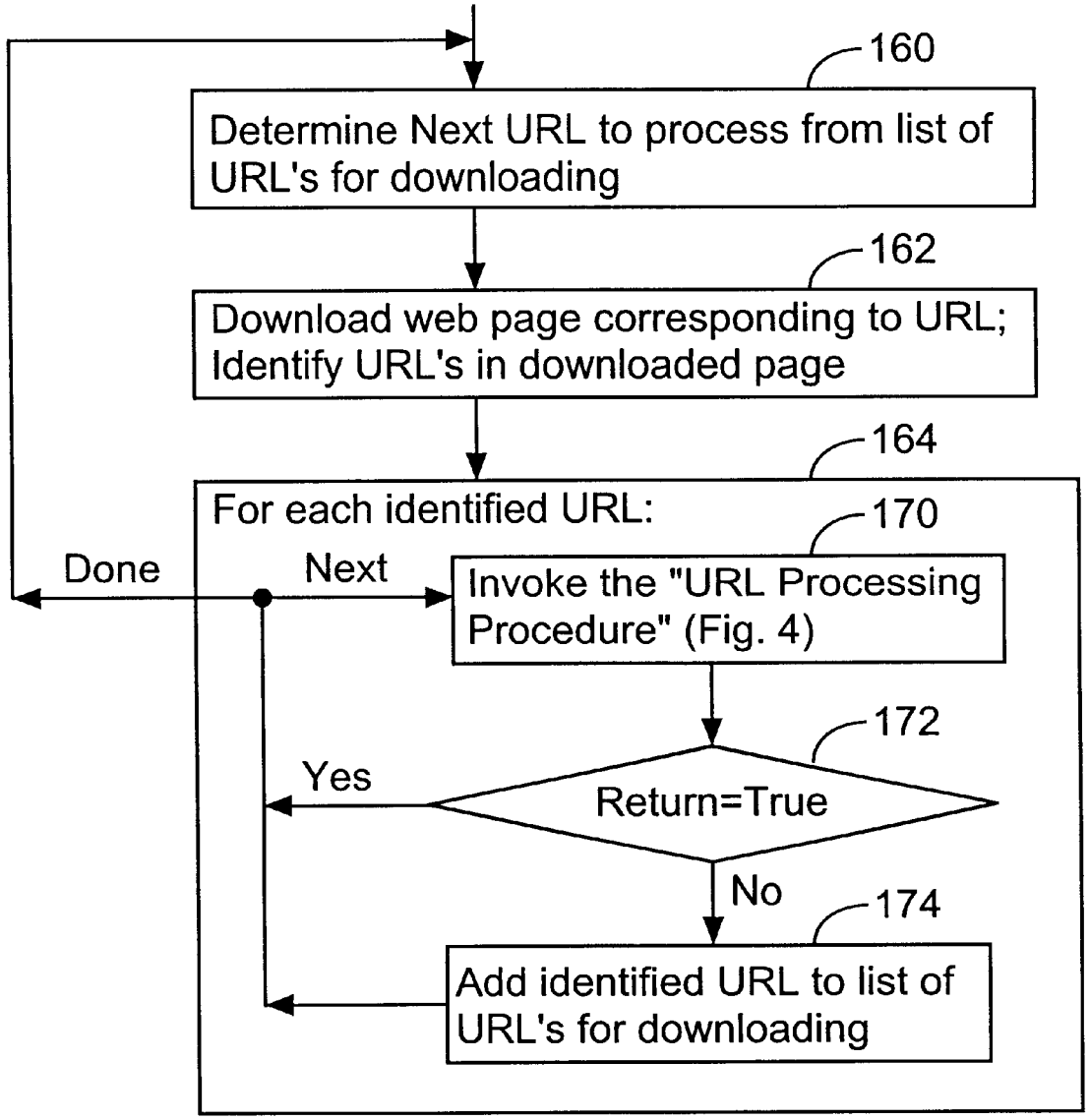
FIG. 3 is a flow chart of a main web crawling procedure executed by each of a plurality of reads in an exemplary embodiment of the invention.

Each thread executes a main web crawler procedure 140, which will be now described with reference to FIG. 3. The web crawler thread determines the URL of the next document to be downloaded (step 160), typically by retrieving it from a queue data structure (not shown). The thread then downloads the document corresponding to the URL, and processes the document (162). That processing may include indexing the words in the document so as to make the document accessible via a search engine. However, the only processing of the document that is relevant to the present discussion is that the main procedure identifies URL's in the downloaded document that are candidates for downloading and processing (step 162). Typically, these URL's are found in hypertext links in the document being processed.

Each identified URL is processed (step 164) to determine if it is the URL for a page already known to the web crawler, or is a "new URL" for a document not previously known to the web crawler. In particular, the thread invokes the URL processing procedure of the present invention (step 170). If that procedure returns a True value (172-Yes), the identified URL is already known to the web crawler, in which case the main procedure continues processing any other identified URL's in the document being processed (step 170). If it returns a False value (172-No), the identifier URL is added to a list of URL's for downloading (step 174), and then the main procedure continues processing any other identified URL's in the document being processed (step 170).

URL Processing Procedure

Figure 4:
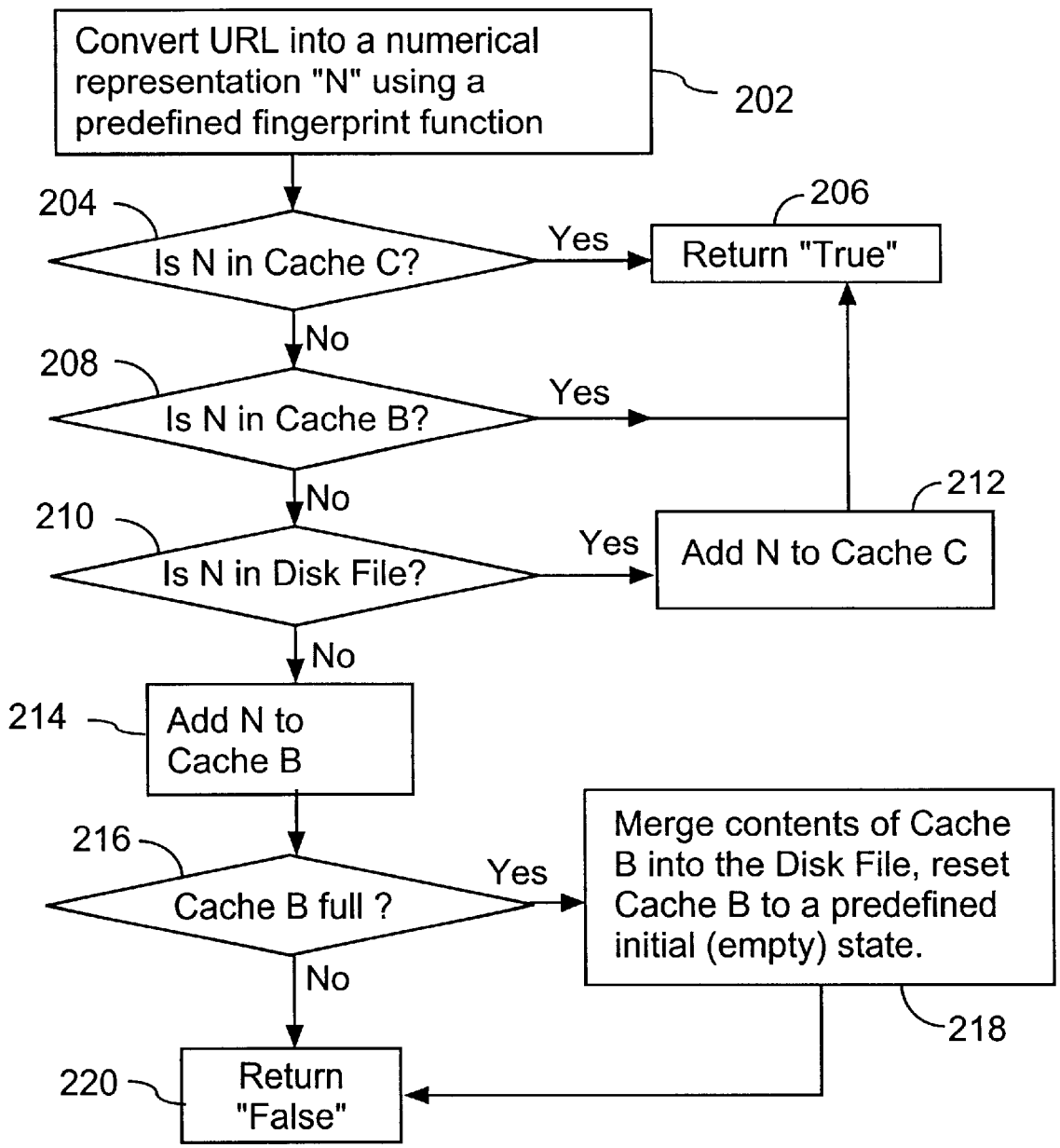
FIG. 4 is a flow chart of a URL processing procedure used in an exemplary embodiment of the invention.

The URL processing procedure invoked in step 170 of the main web crawler procedure is described next with reference to FIG. 4. The first step of the URL processing procedure is to convert a specified UTRL into a fixed length numeric representation (step 202), by applying a predefined fingerprint function, or set of fingerprint functions, to the URL.

The caches C and B 124, 126 and the disk file 136 store fixed length "numeric representations" of URL's instead of storing the corresponding URL's. These fixed length numeric representations are formed as follows. Each URL has a host component identifying the host computer where the corresponding document or web page is stored. The numerical representation of each URL is composed of two fingerprints: (1) a fingerprint of the host name component of the URL and (2) a fingerprint of the entire URL. Each of these fingerprints is formed using a predefined fingerprint function that generates a fixed length result; the results produced by the two functions may have different lengths. Many suitable fingerprint functions are known to those skilled in the art, and thus are not described here.

Prior to generating the two fingerprints for a URL, the host name component "h" of the URL "u" may be resolved into a host identifier "H" using the domain name system 114. The resolved host identifier is preferably a canonical name or a canonical IP address for the host. All host names associated with an Internet host are mapped to the same host identifier. After the host component of the URL is replaced by the host identifier "H," the two fingerprints for the URL are generated. When the term "host component" is used below in connection with the computation of fingerprints for a URL, the host component used is actually the corresponding host identifier "H."

The first fingerprint, of the host identifier "H," has a length of "a" bits, while the second fingerprint, of the full URL has a length of "b" bits. The two fingerprints may be generated using a fingerprint function that generates fixed length initial fingerprints, and then selecting "a" bits of the first initial fingerprint to form the first fingerprint and selecting "b" bits of the second initial fingerprint to form the second fingerprint.

The URL numeric representation is formed by concatenating the first and second fingerprints, to form a numeric representation of length "a+b". The first a-bit portion of a URL numeric representation is called its prefix, while the last b-bit portion of a URL numeric representation is called its suffix. All URL's with the same host component (i.e., host identifier) will have numerical representations having the same a-bit prefix.

In alternate embodiments the two fingerprints could be combined in other ways to form the fixed length URL numeric representation.

After the specified URL has been converted into a numeric representation N, a lookup is performed to see if N is already stored in cache C (step 204), which stores the numeric representations of recently looked up URL's. If N is already stored in cache C, that means that the web crawler already knows the corresponding URL, and therefore no further processing of the URL is needed. The procedure returns a True value (step 206) to indicate that the web crawler has previously "processed" the specified URL, where "processed" means either that the corresponding document has been downloaded and processed, or that the document has already been scheduled for downloading.

If the URL numeric representation N was not found in cache C, a lookup is performed to see if N is already stored in cache B (step 208), which stores the numeric representations of URL's recently added to the list of URL's known to the web crawler. If N is already stored in cache B, that means that the web crawler already knows the corresponding URL, and therefore it returns a True value (step 206).

If the URL numeric representation N was not found in caches C and B, a lookup is performed to see if N is already stored in the disk file (step 210). To do this, a binary search or interpolated binary search is performed on the disk file index to determine which disk block to inspect. Once the disk block corresponding to the numeric representation N has been identified, the operating system determines whether a copy of the disk block is already stored in the buffer cache (see FIG. 2), and if not, reads the disk block into the buffer cache. Finally, an interpolated binary search is performed on the disk block to determine whether or not numeric representation N is already stored in the disk block, and thus in the disk file.

Since the numeric representations of all URL's with the same host component share the same a-bit prefix, the representations of such URL's will be grouped together in the disk file 136, which contains the numeric representations in sorted order. As a result, in the expected case in which the stream of URL's discovered by the web crawler contains a high degree of host locality, there will be a high degree of locality to the parts of the disk file that are accessed during lookups. The operating system's file buffer cache 128 will therefore often contain the requested disk page in memory, which can lead to dramatic performance improvements. If each URL's numeric representation was formed solely from the fingerprint of the entire URL, the numeric representations of URL's with the same host component would be spread across the entire disk file, thereby minimizing the effectiveness of the buffer cache 128.

If the URL numeric representation N is found in the disk file (210-Yes), the numeric representation N is added to cache C (step 212). If cache C is full, an entry in cache C is evicted to make room for the numeric representation N in accordance with a predefined eviction policy. Suitable cache entry eviction policies include evicting a least recently used entry, and evicting entries in round robin order. Numerous cache entry eviction policies are known to those skilled in the art, including many types or variations of the LRU (least recently used) policy.

If the URL numeric representation N was not found in the disk file (212-No), that means the specified URL is a "new URL" for a document not previously known to the web crawler. In this case, the URL numeric representation N is added to cache B (step 214). If adding the URL numeric representation to cache B causes cache B to become fall (216-Yes), then the contents of cache B are merged with the disk file (step 218) and cache B is reset to a predefined initial (i.e., empty) state. During the merging process, the stored numerical representations in cache B 126 and in the disk file 136 are combined and reorganized into a sorted order. The resulting merged set of URL numeric representations are stored in a new disk file, and a new index is generated to represent the first URL numeric representation in each disk block of the new disk file. When the merge process is completed, the old disk file and index are deleted. The process of merging cache B into the disk file is an expensive operation. Therefore cache B is typically made fairly large so as to minimize the frequency of such merge operations.

After a URL numeric representation N is added to cache B (step 214), the procedure returns a False value to indicate that the specified URL was not previously known to the web crawler (step 220).

The foregoing examples illustrate certain exemplary embodiments of the invention from which other embodiments, variations and modifications will be apparent to those skilled in the art. The invention sold therefore not be limited to the particular exemplary embodiments discussed herein, but rather defined by the claims appended hereto.

What is claimed is:

1. A method of downloading data sets from among a plurality of host computers, comprising the steps of:
   (a) storing representations of data set addresses in a set of data structures, including a first cache, a second cache, and a disk file;
   (b) downloading at least one data set that includes addresses of one or more referred data sets;
   (c) identifying the addresses of the one or more referred data sets, and
   (d) for each identified address:
      (d1) generating a fixed-length representation of the identified address;
      (d2) determining first whether the representation of the identified address is stored in the first cache, and when the first determination is negative determining second whether the representation of the identified address is stored in the second cache, and when the second determination is negative determining third whether the representation of the identified address is stored in the disk file;
      (d3) when the third determination is negative, storing the representation of the identified address in the second cache and scheduling the corresponding data set for downloading; and
      (d4) when the third determination is positive, storing the representation of the identified address in the first cache.

2. The method of claim 1, wherein
when the first cache reaches a predefined full condition, one or more data set address representations in the first cache are evicted in accordance with a predefined eviction policy.

3. The method of claim 1, wherein
when the second cache reaches a predefined full condition, the data set address representations in the second cache are merged into the data set address representations in the disk file, and the second cache is reset to a predefined initial state.

4. The method of claim 1, wherein
the disk file in which data set address presentations are stored comprises a sequence of disk blocks;
the data set address representations in the disk file are stored in a predefined sorted order;
step (a) includes generating a disk file index, distinct from said set of data structures, that stores information corresponding to a first data set address representation in each of the disk blocks of the disk file; and
the step of determining whether the representation of the identified address is stored in the disk file includes searching the disk file index to identify a single disk block of the disk file to search.

5. The method of claim 1, wherein
step (d1) includes generating a first fingerprint of only a host address portion of the identified address, and concatenating the first and second fingerprints to form the fixed-length representation of the identified address;
the data set address representations in the disk file each comprise a concatenation of a first fingerprint of only a host address portion of the data set address associated with the data set address representation and a second fingerprint of the data set address, and the data set representations are stored in the disk file in an order corresponding to numeric values of the data address representations.

6. The method of claim 5, wherein the data sets include web pages and the data set addresses include uniform resource locators.

7. The method of claim 1, wherein said step (d1) includes
   (i) obtaining a first representation portion based solely on a host component of said identified address;
   (ii) obtaining a second representation portion based on said identified address; and
   (iii) combining said first and second representation portions.

8. A computer program product for use in conjunction with a computer system, the computer program product comprising a computer readable storage medium and a computer program mechanism embedded therein, the computer program mechanism comprising:
   a disk file, a first cache and a second cache, for storing representations of data set addresses;
   a main web crawler module for downloading and processing data sets stored on a plurality of host computers, the main web crawler module identifying addresses of the one or more referred data sets in the downloaded data sets, and
   an address processing module for processing a specified one of the identified addresses; the address processing module including instructions for:
      generating a fixed-length representation of the identified address;
      determining first whether the representation of the identified address is stored in the first cache, and when the first determination is negative determining second whether the representation of the identified address is stored in the second cache, and when the second determination is negative determining third whether the representation of the identified address is stored in the disk file;
      when the third determination is negative, storing the representation of the identified address in the second cache and scheduling the corresponding data set for downloading; and
      when the third determination is positive, storing the representation of the identified address in the first cache.

9. The computer program product of claim 8, wherein the address processing module includes instructions for determining when the first cache reaches a predefined full condition, and for evicting one or more data set address representations in the first cache in accordance with a predefined eviction policy.

10. The computer program product of claim 8, wherein the address processing module includes instructions for determining when the second cache reaches a predefined full condition and merging the data set address representations in the second cache into the data set address representations in the disk file, and resetting the second cache to a predefined initial state.

11. The computer program product of claim 8, wherein
the disk file in which data set address representations are stored comprises a sequence of disk blocks;
the data set address representations in the disk file are stored in a predefined sorted order;
the address processing module includes instructions for generating a disk file index, distinct from said set of data structures, that stores information corresponding to a first data set address representation in each of the disk blocks of the disk file; and
the address processing module includes instructions for searching the disk file index to identify a single disk block of the disk file to search for the identified address.

12. The computer program product of claim 8, wherein the address processing module includes instructions for generating a first fingerprint of only a host address portion of the identified address, generating a second fingerprint of the identified address, and concatenating the first and second fingerprints to form the fixed-length representation of the identified address; and
the data set address representations in the disk file each comprise a concatenation of a first fingerprint of only a host address portion of the data set address associated with the data set address representation and a second fingerprint of the data set address, and the data set representations are stored in the disk file in an order corresponding to numeric values of the data address representations.

13. The computer program product of claim 12, wherein the data sets include web pages and the data set addresses include uniform resource locators.

14. The computer program product of claim 8, wherein the address processing module includes instructions for
(i) obtaining a first representation portion based solely on a host component of said identified address;
(ii) obtaining a second representation portion based on said identified address; and
(iii) combining said first and second representation portions.

15. A web crawler for downloading data set addresses from among a plurality of host computers, comprising:
a disk file, a first cache and a second cache, for storing representations of data set addresses;
a main web crawler module for downloading and processing data sets stored on a plurality of host computers, the main web crawler module identifying addresses of the one or more referred data sets in the downloaded data sets, and
an address processing module for processing a specified one of the identified addresses; the address processing module including instructions for:
generating a fixed-length representation of the identified address;
determining first whether the representation of the identified address is stored in the first cache, and when the first determination is negative determining second whether the representation of the identified address is stored in the second cache, and when the second determination is negative determining third whether the representation of the identified address is stored in the disk file;
when the third determination is negative, storing the representation of the identified address in the second cache and scheduling the corresponding data set for downloading; and
when the third determination is positive, storing the representation of the identified address in the first cache.

16. The web crawler of claim 15, wherein the address processing module includes instructions for determining when the first cache reaches a predefined full condition, and for evicting one or more data set address representations in the first cache in accordance with a predefined eviction policy.

17. The web crawler of claim 15, wherein the address processing module includes instructions for determining when second cache reaches a predefined full condition and merging the data set address representations in the second cache into the data set address representations in the disk file, and resetting the second cache to a predefined initial state.

18. The web crawler of claim 15, wherein
the disk file in which data set address representations are stored comprises a sequence of disk blocks;
the data set address representations in the disk file are stored in a predefined sorted order;
the address processing module includes instructions for generating a disk file index, distinct from said set of data structures, that stores information corresponding to a first data set address representation in each of the disk blocks of the disk file; and
the address processing module includes instructions for searching the disk file index to identify a single disk block of the disk file to search for the identified address.

19. The web crawler of claim 15, wherein the address processing module includes instructions for generating a first fingerprint of only a host address portion of the identified address, generating a second fingerprint of the identified address, and concatenating the first and second fingerprints to form the fixed-length representation of the identified address; and
the data set address representations in the disk file each comprise a concatenation of a first fingerprint of only a host address portion of the data set address associated with the data set address representation and a second fingerprint of the data set address, and the data set representations are stored in the disk file in an order corresponding to numeric values of the data address representations.

20. The web crawler of claim 19, wherein the data sets include web pages and the data set addresses include uniform resource locators.

21. The web crawler of claim 15, wherein the address processing module includes instructions for
(i) obtaining a first representation portion based solely on a host component of said identified address;
(ii) obtaining a second representation portion based on said identified address; and
(iii) combining said first and second representation portions.

22. The method of claim 7, wherein
the data set address representations in the disk file each comprise a concatenation of a first representation portion of only a host component of the data set address associated with the data set address representation and a second representation portion based on the data set address, and the data set representations are stored in the disk file in an order corresponding to numeric values of the data address representations.

* * * * *